United States Patent
Underwood et al.

(10) Patent No.: US 12,460,586 B1
(45) Date of Patent: Nov. 4, 2025

(54) SYSTEM AND METHOD FOR DETECTING AND RESPONDING TO FLAMEOUT CONDITIONS IN GAS TURBINE ENGINES

(71) Applicant: Solar Turbines Incorporated, San Diego, CA (US)

(72) Inventors: James Jonathan Underwood, Chula Vista, CA (US); Christopher Jeremy Wiggins, Newhall, CA (US); Nathan James Kirksey, San Diego, CA (US); Darrel Patrick Zeltner, Escondido, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 18/887,061

(22) Filed: Sep. 17, 2024

(51) Int. Cl.
*F02C 9/28* (2006.01)

(52) U.S. Cl.
CPC ............ *F02C 9/28* (2013.01); *F05D 2240/35* (2013.01)

(58) Field of Classification Search
CPC ....... F02C 7/262; F02C 9/46; F05D 2270/804
See application file for complete search history.

(56) References Cited

U.S. PATENT DOCUMENTS

| | | | | |
|---|---|---|---|---|
| 5,665,916 A * | 9/1997 | Puster | ............. | G01H 17/00 73/590 |
| 5,828,797 A * | 10/1998 | Minott | ............. | F01D 21/003 385/115 |
| 8,371,102 B1 * | 2/2013 | Lee | ............. | F02C 9/28 356/939 |
| 2004/0257234 A1 * | 12/2004 | Stebbings | ............. | G01J 1/429 250/372 |
| 2006/0137353 A1 * | 6/2006 | Lieuwen | ............. | F23N 5/242 60/803 |
| 2011/0040470 A1 * | 2/2011 | Qiu | ............. | F01D 19/00 701/100 |
| 2012/0131927 A1 * | 5/2012 | Denis | ............. | F02P 23/04 60/776 |
| 2013/0118183 A1 * | 5/2013 | Wang | ............. | F01D 17/20 250/339.04 |
| 2014/0124235 A1 * | 5/2014 | Blakemore | ............. | H02G 15/046 29/825 |

(Continued)

FOREIGN PATENT DOCUMENTS

| CN | 104217526 A | 12/2014 |
|---|---|---|
| CN | 106949976 A | 7/2017 |

(Continued)

*Primary Examiner* — Katheryn A Malatek

(57) ABSTRACT

A system for detecting and responding to a flameout condition in a gas turbine engine includes a probe, a spectral data receiver unit, and a flameout relay. The probe detects a radiation from a gaseous content resulting from a combustion reaction within the gas turbine engine. The spectral data receiver unit processes a signal associated with the radiation for four different wavebands and deduces four different current signals. The flameout relay is triggered to move fueling valves to a shutdown state to halt fuel supply into the gas turbine engine based on at least one of: one or more of the four different current signals meet a predefined condition, or a turbine rotor inlet temperature (TRIT) derived or calculated from the four different current signals is below a temperature threshold or a rate of drop of the TRIT is below a rate threshold.

20 Claims, 6 Drawing Sheets

(56) References Cited

U.S. PATENT DOCUMENTS

| | | | | |
|---|---|---|---|---|
| 2014/0238032 | A1* | 8/2014 | Fitzgerald | F02C 9/26 |
| | | | | 60/793 |
| 2016/0195025 | A1* | 7/2016 | Ajami | G01K 13/02 |
| | | | | 60/734 |
| 2017/0314464 | A1* | 11/2017 | Wang | F02C 6/00 |
| 2020/0249093 | A1* | 8/2020 | Zeltner | G01J 5/0821 |
| 2020/0284200 | A1* | 9/2020 | Manoukian | F02D 31/001 |
| 2023/0111717 | A1* | 4/2023 | Prakash | F02C 9/18 |
| | | | | 60/782 |
| 2024/0309777 | A1* | 9/2024 | Stevenson | F01D 21/003 |
| 2024/0369224 | A1* | 11/2024 | Lal | F02C 7/057 |
| 2025/0116235 | A1* | 4/2025 | Bowen | F02C 7/25 |

FOREIGN PATENT DOCUMENTS

| | | |
|---|---|---|
| CN | 110613912 A | 12/2019 |
| CN | 111275918 A | 6/2020 |

* cited by examiner

SYSTEM AND METHOD FOR DETECTING AND RESPONDING TO FLAMEOUT CONDITIONS IN GAS TURBINE ENGINES

TECHNICAL FIELD

The present disclosure relates to gas turbine engines. More particularly, the present disclosure relates to a system and method for detecting and responding to a flameout condition in a gas turbine engine.

BACKGROUND

Gas turbine engines (GTEs) generally convert energy associated with fuel and air into rotational energy and heat energy. A GTE may include a compressor section, a combustor section, and a turbine section. During operation, air is generally drawn into and compressed within the compressor section. The combustor section receives the compressed air and a fuel and ignites a compressed fuel-air mixture for combustion within the combustor section. Products of combustion are supplied to the turbine section and expanded therewithin to cause a turbine rotor of the turbine section to rotate, thereby producing the rotational energy. The turbine section is typically coupled (e.g., mechanically) to the compressor section, allowing said rotational energy developed at the turbine section to also compress air at the compressor section.

A GTE may suffer from a flameout condition, e.g., a sudden extinction of a combustion flame within the combustor section, while the combustor section may be still supplied with the fuel. Such a flameout condition may not only retard the operation of the GTE but may also undesirably fill the GTE (e.g., the turbine section and/or an exhaust manifold of the GTE) with fuel. If fuel supply were to continue in such a condition, a volume of an unregulated fuel-air mixture formed in the combustor section and/or passed into the turbine section may be unwantedly ignited, e.g., by an auto ignition from bulk exhaust temperature, and/or by a spark, and/or by a residual heat in the turbine section.

Chinese Patent Publication No.: CN110613912A relates to a device and a method for early detection and nondestructive fire extinguishing of a small-space fire, which comprises a detection cavity and a fire extinguishing cavity which are mutually independent. A fan, a detection plate, a first flame detection module and a second flame detection module are arranged in the detection cavity. The first and second flame detection modules have different sensitivities and are sequentially arranged at the flowing position of air to determine whether a fire condition exists in a monitored space. The detection plate sends an instruction to the fire extinguishing cavity when the fire condition exists. The fire extinguishing cavity comprises a jet power device, a jet pipeline, and a nozzle. The jet power device receives an instruction to generate instant impact, and the instant impact is used for scattering fire extinguishing agents to a monitored space through the jet pipeline and the nozzle so that nondestructive fire extinguishing is realized.

SUMMARY

In one aspect, the disclosure is directed to a system for detecting and responding to a flameout condition in a gas turbine engine. The system includes a probe positioned within the gas turbine engine. The probe is configured to detect a radiation from a gaseous content resulting from a combustion reaction within the gas turbine engine. Further, the system includes a spectral data receiver unit to process a signal associated with the radiation for four different wavebands and correspondingly deduce four different current signals. Additionally, the system includes a flameout relay configured to be triggered to move one or more fueling valves of the gas turbine engine to a shutdown state to halt fuel supply into the gas turbine engine based on at least one of: one or more of the four different current signals meet a predefined condition, or a turbine rotor inlet temperature (TRIT) derived or calculated from the four different current signals is below a temperature threshold or a rate of drop of the TRIT is below a rate threshold.

In another aspect, the disclosure relates to a method for detecting and responding to a flameout condition in a gas turbine engine. The method includes positioning a probe within the gas turbine engine to detect a radiation from a gaseous content resulting from a combustion reaction within the gas turbine engine. The method includes using a spectral data receiver unit to process a signal associated with the radiation for four different wavebands to correspondingly deduce four different current signals. Further, the method includes applying a flameout relay. The flameout relay is configured to be triggered to move one or more fueling valves of the gas turbine engine to a shutdown state to halt fuel supply into the gas turbine engine based on at least one of: one or more of the four different current signals meet a predefined condition, or a turbine rotor inlet temperature (TRIT) derived or calculated from the four different current signals is below a temperature threshold or a rate of drop of the TRIT is below a rate threshold.

In yet another aspect, the disclosure is directed to a gas turbine engine. The gas turbine engine includes a compressor section to compress air; a combustor section to receive fuel and a volume of compressed air from the compressor section to define a compressed fuel-air mixture ignitable to attain a combustion reaction; and a turbine section for expanding by-products of the combustion reaction. The by-products include gaseous content resulting from the combustion reaction of the compressed fuel-air mixture at the combustor section. Further, the gas turbine engine includes a system for detecting and responding to a flameout condition in the gas turbine engine. The system includes a probe positioned within the gas turbine engine. The probe is configured to detect a radiation from the gaseous content resulting from the combustion reaction. Further, the system includes a spectral data receiver unit configured to process a signal associated with the radiation for four different wavebands and correspondingly deduce four different current signals. Furthermore, the system includes a flameout relay configured to be triggered to move one or more fueling valves of the gas turbine engine to a shutdown state to halt fuel supply into the gas turbine engine based on at least one of: one or more of the four different current signals meet a predefined condition, or a turbine rotor inlet temperature (TRIT) derived or calculated from the four different current signals is below a temperature threshold or a rate of drop of the TRIT is below a rate threshold.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
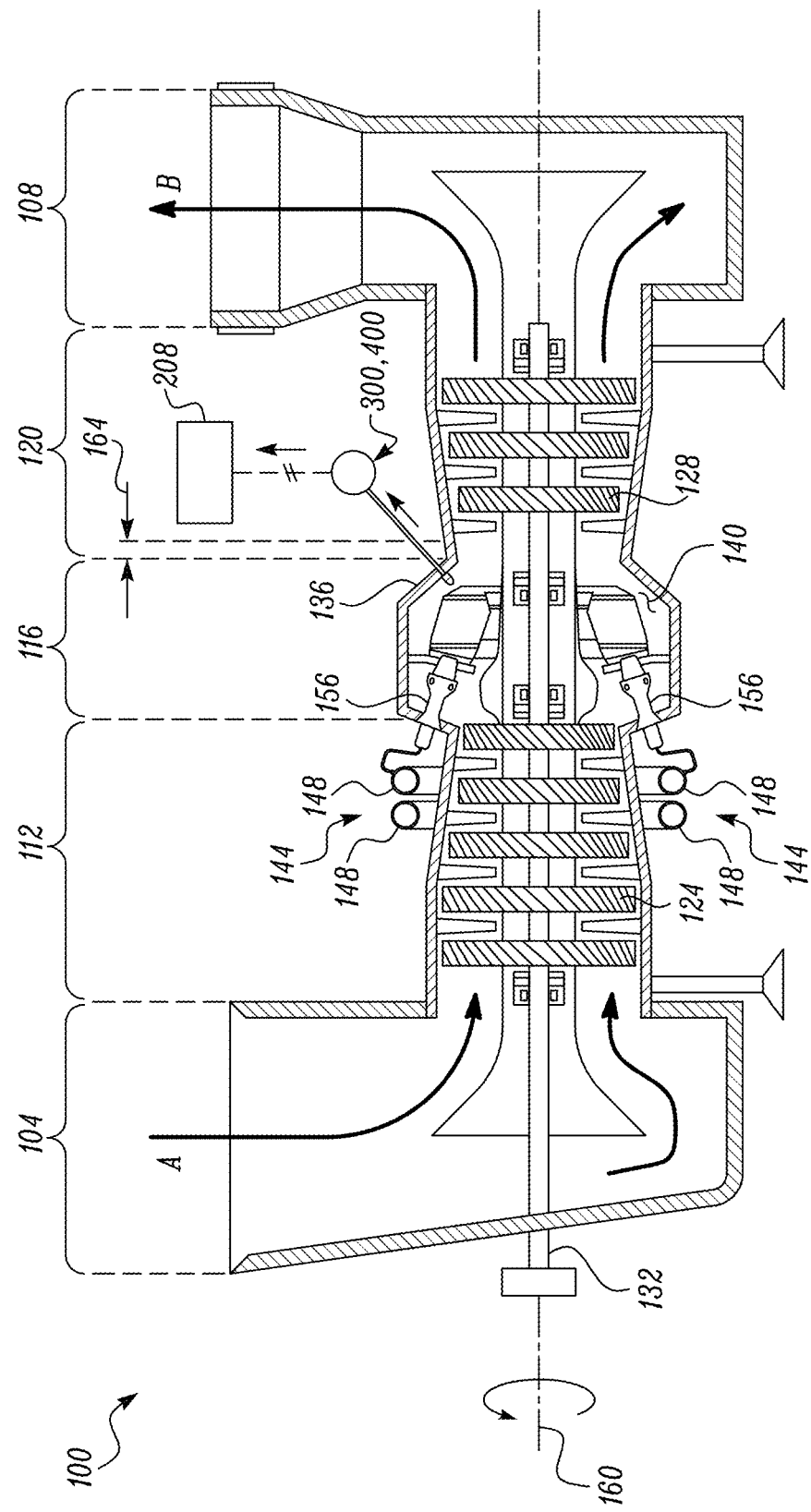
FIG. 1 is a schematic view of an example gas turbine engine, in accordance with an embodiment of the present disclosure.

Referring to FIG. 1, an example gas turbine engine 100 is described. The gas turbine engine 100 may be applied to produce power (e.g., rotary power). Power from the gas turbine engine 100 may be used in a variety of applications and machines, e.g., stationary machines, such as generator sets, for the production of electrical power. The gas turbine engine 100 may be alternatively applied as a prime mover in a mobile machine (not shown). The gas turbine engine 100 may include an intake manifold 104, an exhaust manifold 108, a compressor section 112, a combustor section 116, and a turbine section 120. Although not limited, the sections (i.e., the compressor section 112, the combustor section 116, and the turbine section 120) may be sequentially positioned between the intake manifold 104 and the exhaust manifold 108, as shown. According to an example layout, therefore, the combustor section 116 may be positioned in between the compressor section 112 and the turbine section 120.

The compressor section 112 and the turbine section 120 may respectively define multiple compressor disk blade assemblies (only one compressor disk blade assembly 124 is annotated in FIG. 1) and multiple turbine disk blade assemblies (only one turbine disk blade assembly 128 is annotated in FIG. 1). Also, the gas turbine engine 100 may include a shaft 132 passing (at least partly) through each of the compressor section 112, the combustor section 116, and the turbine section 120. In some embodiments, the shaft 132 may be connected to each of the compressor disk blade assemblies and to each of the turbine disk blade assemblies.

Further, the combustor section 116 may include a combustor wall 136 delimiting a combustion chamber 140 of the gas turbine engine 100. The combustion chamber 140 may provide a space within which a combustion reaction may occur during operations. Walls delimiting various chambers and spaces may be present at the other sections, e.g., the turbine section 120 and the compressor section 112, as well.

The gas turbine engine 100 may also include a fuel injector assembly 144. The fuel injector assembly 144 may include one or more fuel pipes or one or more fuel supply rails (e.g., see fuel supply rails 148) (also shown in FIG. 2). The fuel supply rail 148 may provide passage to a fuel (such as a gaseous fuel, for example, Natural Gas or Hydrogen) to be introduced or injected into the combustion chamber 140 of the gas turbine engine 100. An ignition of the fuel (with compressed air) may result in combustion and power generation within the combustion chamber 140. Although not limited, the fuel supply rail 148 may be circular in profile and may go at least partly around one or more sections (e.g., the compressor section 112 or the combustor section 116) of the gas turbine engine 100, as shown. As an example, only one the fuel supply rail 148 is annotated and/or marked in FIGS. 1 and 2, but the gas turbine engine 100 may include additional fuel supply rails.

Figure 2:
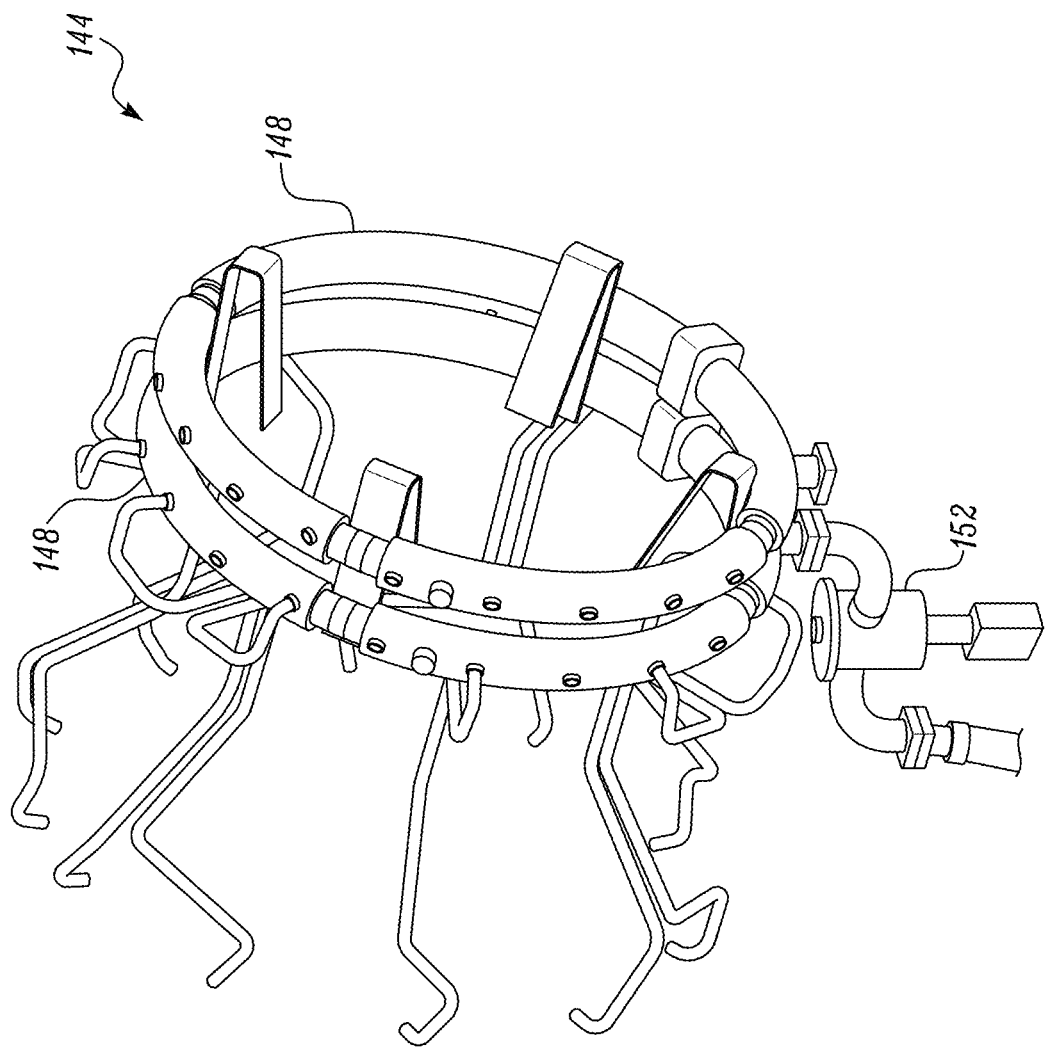
FIG. 2 is a view of an example fuel injector assembly of the gas turbine engine, in accordance with an embodiment of the present disclosure.

In some embodiments, the fuel injector assembly 144 may also include a fueling valve 152 (see FIG. 2). The fueling valve 152 may be operably coupled to the fuel supply rail 148, e.g., to regulate the supply of the fuel into the combustion chamber 140 through the fuel supply rail 148. Although not limited, a position of the fueling valve 152 may be close enough to the fuel supply rail 148 to ensure that when the fueling valve 152 moves from an open state to a closed state, the fueling valve may leave at best only a minimum or significantly low volume of fuel in the fuel supply rail 148. Such positioning of the fueling valve 152 mitigates (or altogether arrests) chances for any significant volume of fuel to unduly escape further downstream from the fueling valve 152 (e.g., into the combustion chamber 140) once the fueling valve 152 is closed. The combustor section 116 may additionally include one or more burner portions 156, e.g., to generate or fuel a flame, within the combustion chamber 140.

During operation, air is drawn into the compressor section 112 through the intake manifold 104 (see direction, A, FIG. 1). The drawn air is pressurized and compressed at the compressor section 112, e.g., by rotating the compressor disk blade assemblies (e.g., the compressor disk blade assembly 124) positioned at the compressor section 112. The compressed air, generated at the compressor section 112, may be directed towards the combustor section 116. The combustor section 116 may receive the compressed air and may facilitate a mixing of the compressed air with the fuel (injected by the fuel injector assembly 144 into the combustor section 116) thus helping form a fuel-air mixture within the combustion chamber 140. As an example, the fuel may be injected into a stream of an inflowing compressed air volume received from the compressor section 112, thereby causing the fuel to mix vigorously and relatively quickly with the inflowing compressed air. The fuel-air mixture, thus formed, may come in contact with an ignition source (not shown) to generate the flame and thus result in the combustion reaction, e.g., at the combustor section 116.

Byproducts of the combustion reaction may include hot gases that may expand and move at a relatively very high speed into the turbine section 120. In so doing, the hot expanding gases may push against the turbine disk blade assemblies (e.g., the turbine disk blade assembly 128) situated at the turbine section 120 and may in turn cause them (e.g., in conjunction with the shaft 132) to rotate. As an example, the turbine disk blade assemblies (e.g., the turbine disk blade assembly 128) may define multiple turbine stages for the inflowing hot gases of combustion inflowing from the combustor section 116, with each stage increasing a speed of exit of the hot expanding gases through the exhaust manifold 108 (see direction, B, FIG. 1). In that manner, the turbine section 120 may use the energy of the hot expanding gases to rotate the shaft 132, while also routing and pushing the hot expanding gases for an exit through the exhaust manifold 108. Terms 'upstream' and/or 'downstream' used herein may be applied generally with reference to the flow of the hot expanding gases moving from the combustor section 116 towards the turbine section 120.

The shaft 132 may rotate (e.g., about a common axis 160) during an operation of the gas turbine engine 100 for the production of the rotary power and by way of which energy, e.g., in the form of electrical energy, may be in turn generated. A manner of producing electrical energy by using rotary power from a gas turbine engine 100 is well known and thus will not be discussed. Although the configuration of the gas turbine engine 100 discussed above, aspects of the present disclosure may be suitably applied to various other configurations and layout of the gas turbine engine 100, which may be now known or in the future developed. Also, working temperatures within the combustor section 116 and the turbine section 120 may be relatively high during operations. In this regard, temperature at an inlet area 164 of the turbine section 120 may be referred to as a turbine rotor inlet temperature (TRIT). The inlet area 164 may correspond to a sub-section or an interface that transitions from the combustor section 116 to the turbine section 120), as may be visualized from FIG. 1.

Figure 3:
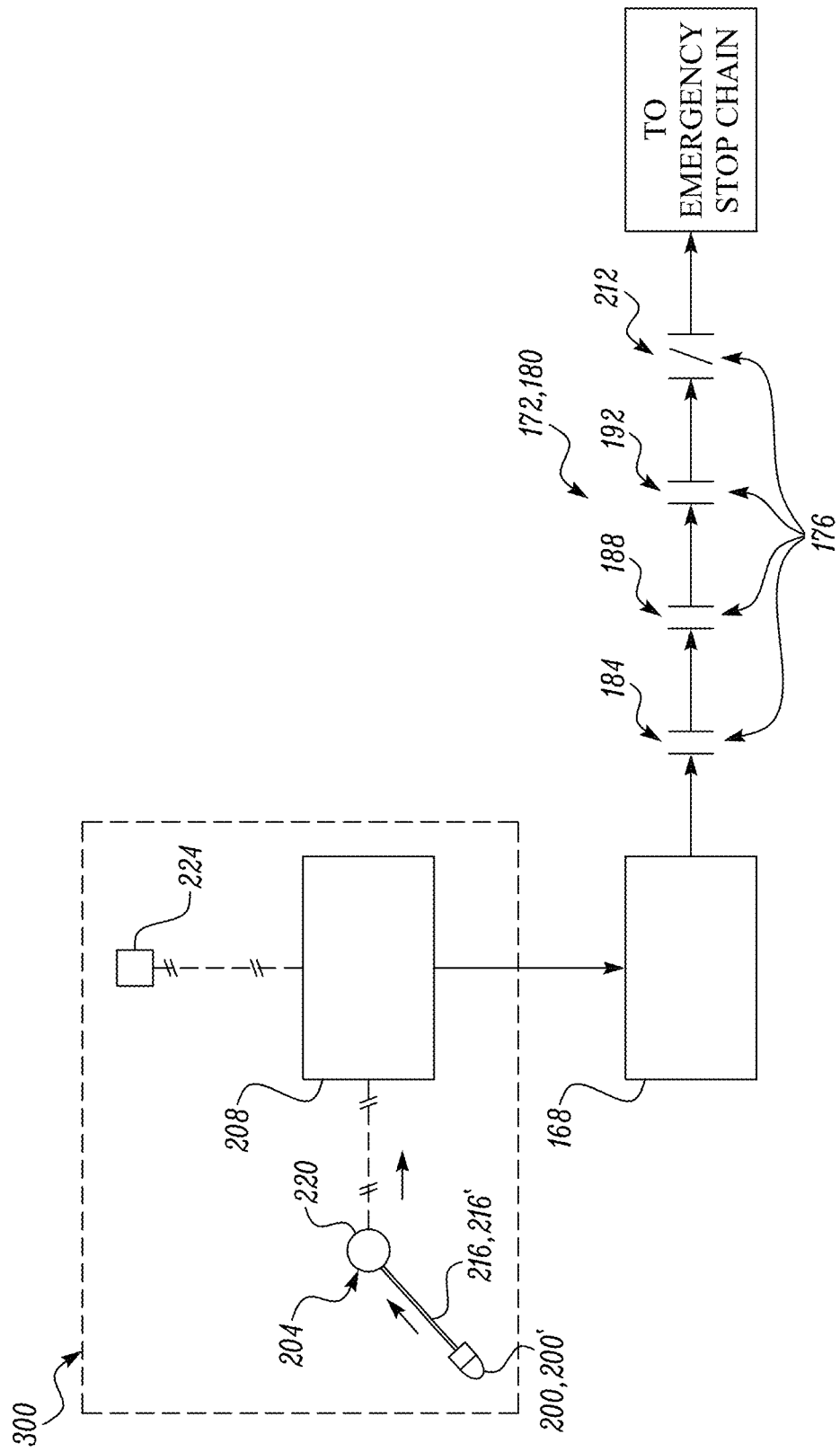
FIG. 3 is an example system for detecting and responding to a flameout condition in the gas turbine engine, in accordance with an embodiment of the present disclosure.
Figure 4:
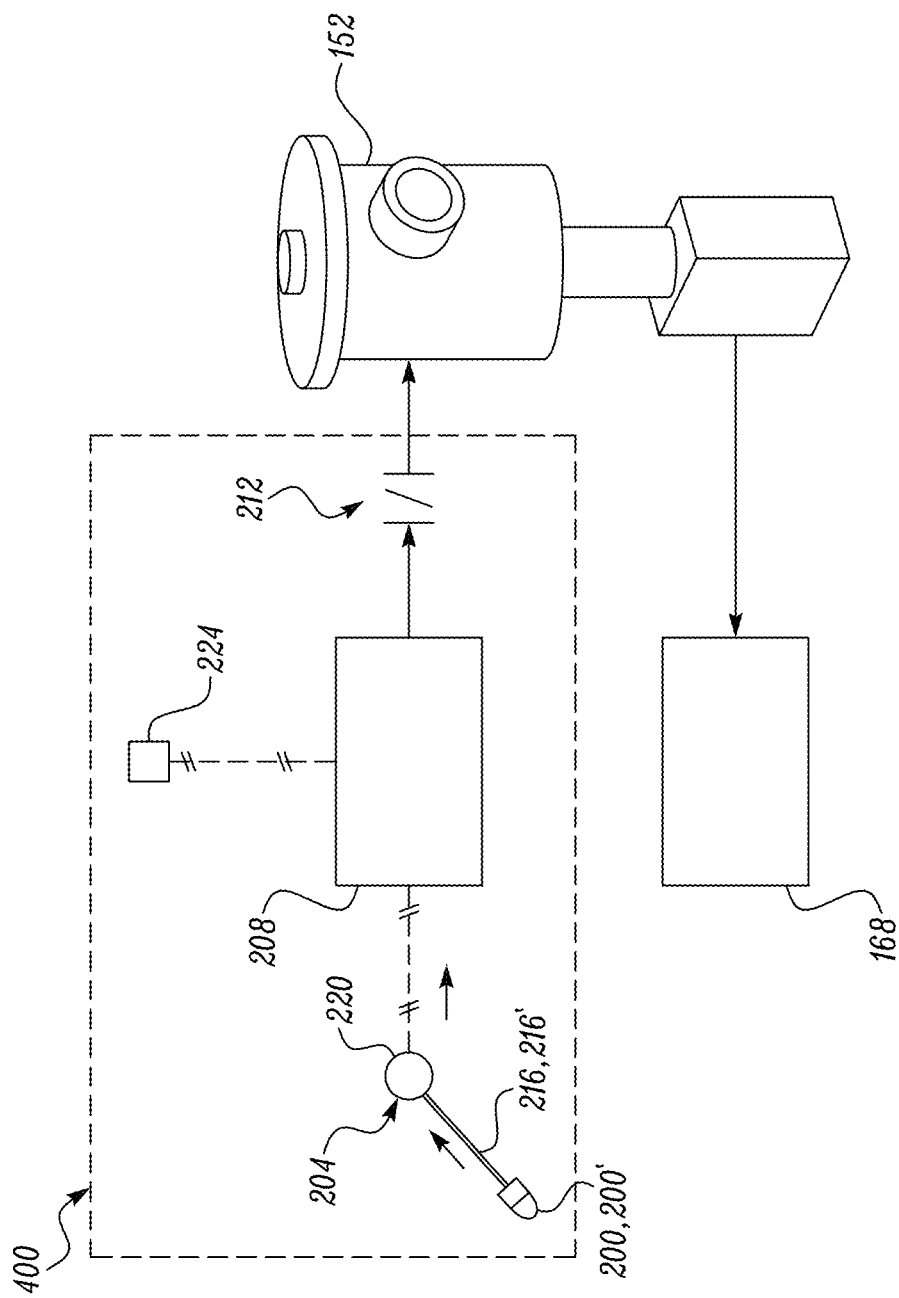
FIG. 4 is another example system for detecting and responding to a flameout condition in the gas turbine engine, in accordance with an embodiment of the present disclosure.

Referring to FIGS. 3 and 4, the gas turbine engine 100 may include a high-level fast acting control system (referred to as a main controller 168). The main controller 168 may be tasked with the with performance of several functions associated with a running of the gas turbine engine 100. Further details related to the main controller 168 shall be discussed further below and its example manner of functioning or working with respect to one or more aspects of the present disclosure, are also described below.

As may be viewed and understood from FIG. 3, the gas turbine engine 100 may also include a shutdown system 172 (see FIG. 3). The shutdown system 172 may have multiple relays 176 which may be operably/communicatively coupled with the main controller 168, as shown. As an example, the shutdown system 172 may ensure that, at least partly or fully, a running of the gas turbine engine 100 comes to a stop or that the gas turbine engine 100 is deactivated or shut down when any condition needed for an optimal and/or an efficient operation of the gas turbine engine 100 is not met. The shutdown system 172 may be also referred to as a 'shutdown relay system 180' as it may include the relays 176, noted above, and a series of which may be triggered for the gas turbine engine's deactivation or shutdown—e.g., the gas turbine engine's deactivation or a shutdown may include moving the fueling valve 152 to the closed state or a shutdown state. Also, it will be appreciated that the shutdown relay system 180 may be applicable to deactivate the gas turbine engine 100 when any of the multiple relays 176 of the shutdown relay system 180 is supplied with a shutdown signal, e.g., by the main controller 168 of the gas turbine engine 100.

A functioning of each of the relays 176 of the shutdown relay system 180 may be associated with a respective condition of the gas turbine engine 100. As an example, a first relay 184 may be associated with an active condition of the main controller 168 (i.e., that the main controller 168 is active); a second relay 188 may be associated with an active fueling condition of the gas turbine engine 100 (i.e., that combustion chamber 140 is receiving the fuel for combustion from the fuel injector assembly 144); a third relay 192 may be associated with any hazard condition associated with the gas turbine engine 100; etc.

A non-conformance to any of these conditions may, for example, result in a triggering of the corresponding relay, and thus, at least partly or fully, deactivating or shutting down of the gas turbine engine 100—e.g., the gas turbine engine's deactivation or a shutdown may include moving the fueling valve 152 to the closed state or a shutdown state, as noted above. The shutdown relay system 180 may include additional (or lesser) relays and/or contacts that may function in a known manner, and those that have been discussed here are purely examples Details related to those relays and contacts have not been discussed for brevity and conciseness of the present disclosure.

With continued reference to FIGS. 3 and 4, systems 300, 400 of the gas turbine engine 100 are also shown and discussed. The systems 300, 400 are configured for detecting and responding to a flameout condition in the gas turbine engine 100. The flameout condition corresponds to an extinction of the flame within the combustor section 116 of the gas turbine engine 100. The systems 300, 400 assist with detecting such a flameout condition and also function to regulate (or stop) the flow of fuel through the fuel supply rail 148, e.g., by controlling the fueling valve 152 or by altogether closing the fueling valve 152, e.g., by moving the fueling valve 152 to the closed state. Such control or closure of the fueling valve 152 ensures that the supply of the fuel into the combustor section 116 (or the combustion chamber 140) may be controlled or halted in response to the flameout condition. In other words, the systems 300, 400 function to ensure that the gas turbine engine 100 may be deactivated or shutdown in the case of the flameout condition. The systems 300, 400 may be applied independently of each other in the gas turbine engine 100.

The systems 300, 400 may include similar or same components, for example, a probe 200, a spectral data receiver unit 204, and a microcontroller 208, as shown. Further, one or both of the systems 300, 400 may also include a flameout relay 212, as well. As may be noted from the below description, the systems 300, 400 are example embodiments and may differ in their general configurations. However, since they may have similar or same components, similar reference numerals may be used, wherever possible, to refer to same or like parts of the systems 300, 400.

With regard to the flameout relay 212, the flameout relay 212 may be associated (and/or operably coupled) with the fueling valve 152 (see FIGS. 2 and 4). In so doing, the flameout relay 212 may be configured (e.g., calibrated in some cases) to be triggered to move the fueling valve 152 of the gas turbine engine 100 to a shutdown state. In the shutdown state of the fueling valve 152, the fueling valve 152 may halt a fuel supply into the gas turbine engine 100 (e.g., into the combustor section 116 of the gas turbine engine 100).

With reference to FIG. 3, the system 300 may be operably coupled with the shutdown relay system 180 of the gas turbine engine 100. According to some embodiments, the flameout relay 212 of the system 300 may be associated with the shutdown relay system 180, as discussed above. In other words, the flameout relay 212 may be one among the many relays 176 of the shutdown relay system 180 or may be coupled and integrated with a series of additional relays (i.e., the relays 176) to define the shutdown relay system 180 of the gas turbine engine 100. In such a case, to cause the fueling valve 152 to halt fuel supply into the combustor section 116 of the gas turbine engine 100 in response to the flameout condition, the microcontroller 208 may be configured to deliver a flameout signal to the main controller 168 of the gas turbine engine 100 to trigger all relays 176 (including the flameout relay 212) across the shutdown relay system 180. In so doing, the fueling valve 152 may be moved to a shutdown state, and, therefore, in some cases, also deactivate or shut down the gas turbine engine 100.

With reference to FIG. 4 now, the flameout relay 212 of the system 400 may be independent of the shutdown relay system 180. In such a case, to cause the fueling valve 152 to halt fuel supply into the combustor section 116 of the gas turbine engine 100 in response to the flameout signal, the microcontroller 208 may deliver (e.g., directly deliver) the flameout signal to the flameout relay 212 of the system 400 (e.g., to the flameout relay 212 alone) so as to apply and/or trigger the flameout relay 212 and accordingly move the fueling valve 152 to the closed state or to the shutdown state. Although not limited, in one or both of the systems 300, 400, the flameout relay 212, as applied, may correspond to an optical relay. The system 400 may include additional devices, such as more relays and/or contacts, which may ensure a suitable integration of the system 400 into the gas turbine engine 100. Details of such devices may be contemplated by someone in the art and are thus not discussed.

Optionally, or additionally, and with continued reference to the system 400, it is possible that a shutdown signal is generated (e.g., by the microcontroller 208) corresponding to the shutdown state of the fueling valve 152. In such a case, the microcontroller 208 may supply the shutdown signal to the main controller 168 of the gas turbine engine 100. In some embodiments, in response to receiving the shutdown signal by the main controller 168, the main controller 168 may perform a predetermined task, e.g., the main controller 168 may trigger all relays 176 across the shutdown relay system 180 to ensure a deactivation or shut down of all parts/portions the gas turbine engine 100 and/or determining a working state of the gas turbine engine 100.

Effectively, the configurational differences between the control environments and/or systems 300, 400 of FIG. 3 and FIG. 4, correspondingly, is that, in system 300, the flameout relay 212 is integral to the shutdown relay system 180, while in system 400, the flameout relay 212 is independent of the shutdown relay system 180 and may receive signals or be triggered directly by the microcontroller 208. Components associated with or common to each of the systems 300, 400 will now be further discussed. As similar reference numerals may be used wherever possible to refer to same or like parts, components such as the probe 200, the spectral data receiver unit 204, etc., may be found in both system 300 and system 400 and thus in both FIGS. 3 and 4.

The probe 200 may be positioned and/or connected within the gas turbine engine 100 (e.g., within the combustor section 116 or within the combustion chamber 140 of the gas turbine engine 100). The probe 200 may help detect the radiation or light emission (e.g., infrared light emission) from a gaseous content resulting from the combustion reaction (e.g., at the combustor section 116 of the gas turbine engine 100). Although not limited, the term radiation, as used in the present disclosure, may correspond to light intensity or electromagnetic emission. As an example, the gaseous content may include water vapor ($H_2O$) and the probe 200 may detect light emission from water particles present in the gaseous content, e.g., at the combustor section 116 and/or at the turbine section 120, of the gas turbine engine 100. Although not limited, the probe 200 may be operable to endure pressures up to 30 atmospheres and temperatures up to 1650 Kelvin, generally found in gas turbine engines. Nonetheless, such values are provided for illustrative purposes alone and can include other values.

Further, although not limited, the probe 200 may be positioned upstream to the multiple turbine disk blade assemblies, e.g., in the combustor section 116 (for reference, see probe 200 which is positioned upstream to the turbine disk blade assembly 128 in FIG. 1). In some embodiments, the probe 200 may be positioned relatively downstream to the combustor section 116 (or the combustion chamber 140 of the combustor section 116) along a direction of flow of the gaseous content resulting from the combustion reaction at the combustor section 116—e.g., the probe 200 may be positioned further downstream to the combustor section 116 and, at least partly or fully, into the turbine section 120, but may still acquire a position relatively upstream to the turbine disk blade assemblies (see turbine disk blade assembly 128).

In one example, the probe 200 may include or correspond to a pyrometer probe 200' and/or may include a lens (not shown) to receive the radiation or the light emission. Although a single probe is shown and discussed in the present disclosure, several probes may be applied in the gas turbine engine 100 to detect light intensities from several different regions of the gaseous content. As an example, such probes may be arrayed around the shaft 132, or around the common axis 160 defined by the shaft 132.

The spectral data receiver unit 204 may be configured to process a signal (e.g., a light signal) associated with the radiation or light emission for four different wavebands and correspondingly deduce four different current signals. To this end, the spectral data receiver unit 204 may include a fiber 216 and a detector 220 (e.g., a light detector 220). The fiber 216 may be an optical fiber and/or a sapphire fiber 216' which may be coupled between the probe 200 and the detector 220 or may be operably coupled to each of the probe 200 and the detector 220. As an example, the fiber 216 may be configured to be routed through an outer wall (e.g., the combustor wall 136) of the gas turbine engine 100 and may extend at least partly out of the gas turbine engine 100 in order to connect (e.g., operably connect) the probe 200 to the detector 220. In some embodiments, the spectral data receiver unit 204 includes one or both of a pyrometer detector and/or an ultraviolet (UV) flame detector.

The fiber 216 may serve as a transmission channel for the radiation or the corresponding signal. To this end, the fiber 216 may be configured to receive the radiation from the probe 200 and may transmit or may provide passage to the same from the probe 200, along its length, to the detector 220. In effect, the fiber 216 may be operable to receive the infrared light emitted from the gas or combustion byproducts and transmit the infrared light to the detector 220. In some examples, the fiber 216 may be operable to transmit light emissions within 1.7 to 2.63 micrometer range. Further, in some embodiments, the fiber 216 may include a pure silica fiber or other suitable optical fibers. In some embodiments, the fiber 216 may be able to accommodate bends and/or turns to be positioned suitably (e.g., in a variety of orientations) outside the outer wall (e.g., the combustor wall 136) of the gas turbine engine 100. It will be appreciated that the above values are provided for illustrative purposes alone and thus may include other values.

Figure 5:
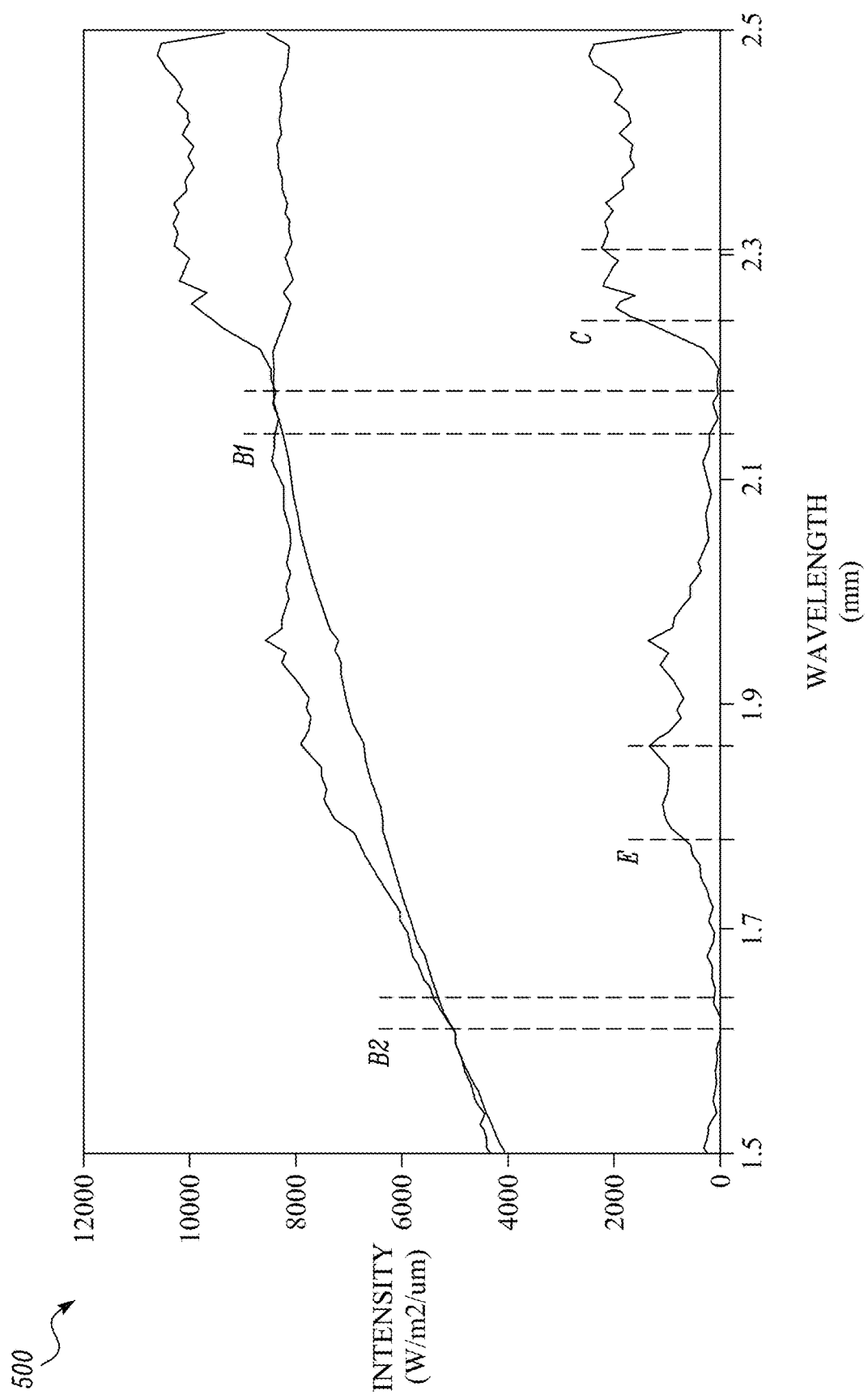
FIG. 5 is a graphical representation in which light emission curves, resulting from a combustion reaction at a combustor section, are indicated with respect to intensity and wavelength and which are applied in calculating a turbine rotor inlet temperature (TRIT), in accordance with an embodiment of the present disclosure.

The detector 220 (e.g., light detector 220) may be operably coupled with the fiber 216 and may be configured to receive the radiation from the fiber 216. More particularly, the radiation or the light emission that passes through the fiber 216 (e.g., through the sapphire fiber 216') may be received by the detector 220. In some embodiments, the spectral data receiver unit 204 may include a filter unit (not shown). The filter unit may be an optical filter unit that may possess characteristic spectral properties to allow only infrared light within certain selective light wavelength bands or simply wavebands, e.g., four (4) different wavebands, i.e., B1, B2, C, and E, as shown in a graph 500 of FIG. 5, to pass through or across the filter unit. Simultaneously, the filter unit may filter out or block out light falling outside of the selective wavebands B1, B2, C, and E. In that manner, the detector 220 may process the signal (e.g., the light signal) for four (4) different bandwidths. Wavebands C and E may correspond to gas emissions associated with the combustion reaction, while wavebands B1 and B2 may correspond to wall emissions associated with the combustion reaction.

In some embodiments, such a filter unit corresponds to or may include multiple individual filters. Such filters can be selected such that light within a first waveband may be allowed through a first filter, light within a second waveband band may be allowed through a second filter, light within a third waveband may be allowed through a third filter, and light within a fourth waveband may be allowed through a fourth filter. In some embodiments, the detector 220 may also convert the signal into four (4) different current signals (mA) to correspond to the four (4) different bandwidths.

Additionally, or optionally, a sensor unit (not shown) may be used to detect the infrared light that is allowed to pass through the filter unit. Such a sensor unit can correspond to or include multiple sensors (e.g., one sensor per waveband). In some embodiments, the infrared light received by the sensor unit may be converted into a digital signal, e.g., by a processor (not shown). The digital signal may then be transmitted from the sensor unit to a controller (e.g., the microcontroller 208) through an input/output circuit such that the controller can obtain corresponding voltage signals, as will be discussed below. In some embodiments, the spectral data receiver unit 204 may further include a Fourier transform infrared spectrometer. Moreover, the spectral data receiver unit 204 can also include several infrared detectors, optical filters, and sensors such as thermopile detectors, polycrystalline lead sulfide detectors, indium gallium arsenide photodiode detectors infrared light filters, and liquid nitrogen cooled sensors, to perform one or more of the aforesaid functions.

In some embodiments, the system 300, 400 may include a Printed Circuit Board (PCB) hardware device which may be associated or operably coupled with the probe 200 and/or with the spectral data receiver unit 204. The PCB hardware device may be applied to read the signals (e.g., the current signals and/or digital signals), e.g., received from the detector 220. In response to the receipt and reading of the signals, e.g., from the detector 220, the PCB hardware device may function to convert the four separate current (mA) signals and/or digital signals to obtain corresponding voltage (mV) signals, e.g., 4 (four) voltage signals that may correspond to the 4 (four) current signals discussed above. Further, in some embodiments, the PCB hardware device may be a part of or may be one and the same as the microcontroller 208, as discussed above, for the systems 300, 400.

The microcontroller 208 may be coupled with the spectral data receiver unit 204 and may be configured to receive the signals (e.g., the current signals and/or digital signals) and/or the voltage (mV) signals obtained by the PCB hardware device. It may be understood that when the PCB hardware device is part of or is one and the same as the microcontroller 208, the microcontroller 208 may function to convert the current signals (mA) into voltage signals (mV).

In response to such receipt of the signals, the microcontroller 208 may be configured to retrieve a set of instructions, e.g., from a memory 224. The microcontroller 208 may be configured to execute the set of instructions to perform one or more functions. As an example, the functions include calculation of the turbine rotor inlet temperature (TRIT) based on the four different current signals (and/or voltage signals) by using an Integrated Spectral Band Ratio (ISBR) method. The functions may further include a determination of the flameout condition and a corresponding generation of a flameout signal in the gas turbine engine 100 when at least one of: the TRIT is below a temperature threshold, T, or when a rate of drop of the TRIT is below a rate threshold, RT. The temperature threshold, T, and the rate threshold, RT, may include values which may be stored in the memory 224, and which may be accessed by the microcontroller 208, as and when the same is needed. Additionally, the functions may also include causing the fueling valve 152 of the gas turbine engine 100 to halt fuel supply into the combustor section 116 of the gas turbine engine 100 in response to the flameout signal. Further details related to such a functionality is set out further below in the present disclosure.

The microcontroller 208 may be communicably coupled to the gas turbine engine's main control module (not shown), such as a safety module or a dynamics module, or may be configured as a stand-alone entity. Optionally, the microcontroller 208 may be integral to and be one and the same as the main controller 168 of the gas turbine engine 100. Further, the microcontroller 208 may include a microprocessor-based device, and/or may be envisioned as an application-specific integrated circuit, or other logic devices, which provide controller functionality, and such devices being known to those with ordinary skill in the art.

In one example, it is possible for the microcontroller 208 to include or be representative of one or more controllers having separate or integrally configured processing units to process a variety of data (e.g., input or commands or signals). In some embodiments, a transmission of data between the microcontroller 208 and various other controllers and devices, such as the detector 220, the flameout relay 212, other input/output devices of the gas turbine engine 100, etc., may be facilitated wirelessly or through a standardized CAN bus protocol. The microcontroller 208 may be optimally suited for accommodation within certain machine panels or portions from where the microcontroller 208 may remain accessible for ease of use, service, calibration, repairs, and replacements. In some embodiments, the microcontroller 208 may be a part of or integrally configured with the main controller 168 of the gas turbine engine 100, although it is possible for the microcontroller 208 to exist independent and/or separately of the main controller 168 of the gas turbine engine 100.

Processing units of the microcontroller 208, to convert and/or process various input, command, signals, and/or the like, may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Examples of the memory 224 may include a hard disk drive (HDD), and a secure digital (SD) card. Further, the memory 224 may include non-volatile/volatile memory units such as a random-access memory (RAM)/a read only memory (ROM), which may include associated input and output buses. The memory 224 may be configured to store various other instruction sets for various other functions of the gas turbine engine 100, along with the set of instruction, discussed above.

INDUSTRIAL APPLICABILITY

Figure 6:
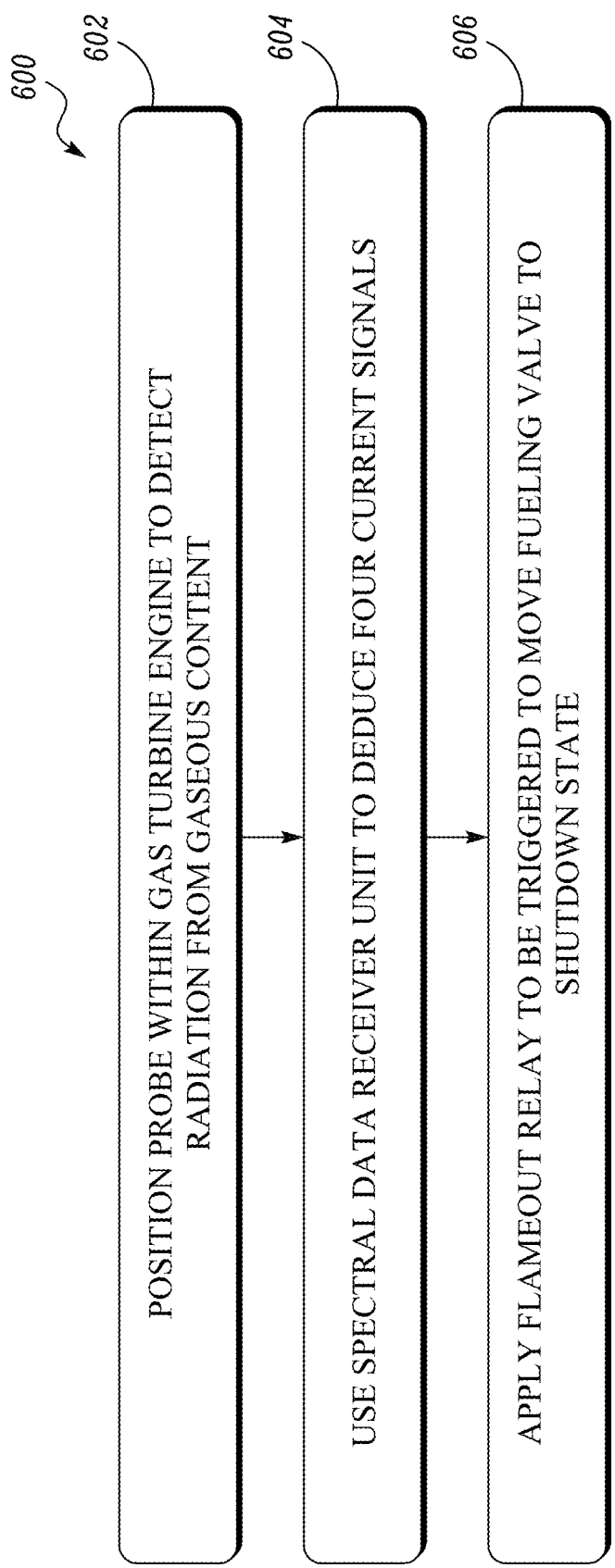
FIG. 6 is a flowchart indicating an example method for detecting and responding to the flameout condition in the gas turbine engine, in accordance with an embodiment of the present disclosure.

Referring to FIG. 6, an example method for detecting and responding to the flameout condition in the gas turbine engine 100, using the system 300, 400, is described by way of a flowchart 600. The method is described in conjunction with FIGS. 1 through 5. The method starts at block 602.

At block 602, during operations of the gas turbine engine 100, the probe 200 may be positioned within the gas turbine engine 100. The probe 200 detects the radiation from the gaseous content within the gas turbine engine 100. As an example, the gaseous content may result from the combustion reaction at the combustor section 116 of the gas turbine engine 100. The radiation or the light emission detected by the probe 200 may be transmitted to the spectral data receiver unit 204 to be further processed to determine if there is a flameout condition in the gas turbine engine 100, or not. The method proceeds to block 604.

At block 604, the spectral data receiver unit 204 may be used. For example, the spectral data receiver unit 204 receives and processes the signal (e.g., the light signal) associated with the radiation for four different wavebands to correspondingly deduce four different current signals. To this end, the radiation or the light emission received from the probe 200 may pass into the fiber 216. The fiber 216 may carry the corresponding signal (e.g., the light signal) and deliver the signal to the detector 220 (e.g., the light detector 220). The detector 220 in turn may process the signal for four (4) different bandwidths, e.g., by having four different filters to filter out the signal for four (4) different bandwidths and/or by having four (4) different sensors to sense said signals in the four (4) different bandwidths. The detector 220 may correspondingly deduce four (4) different current signals. The method proceeds to block 606.

At block 606, the flameout relay 212 may be applied such that the flameout relay 212 can be triggered to move the fueling valve 152 of the gas turbine engine 100 to the shutdown state to halt fuel supply into the gas turbine engine 100 (e.g., into the combustor section 116 of the gas turbine engine 100). According to some aspects of the present disclosure, the triggering of the flameout relay 212 may be based on at least one of: one or more of the four different current signals meet a predefined condition, or the turbine rotor inlet temperature (TRIT) derived or calculated from the four different current signals is below a temperature threshold or a rate of drop of the TRIT is below a rate threshold.

With regard to the predefined condition, the flameout relay 212 may be calibrated such that the flameout relay 212 may be triggered to move the fueling valve 152 of the gas turbine engine 100 to the shutdown state to halt the fuel supply as soon as data or an amplitude or a value associated with one or more of the four different current signals (e.g., corresponding to one or more wavebands B1, B2, C, and E) recedes below a minimum signal threshold or a minimum current threshold. Such receding or drop may correspond to the meeting of the predefined condition. In some embodiments, non-receipt of values and/or signals corresponding to some wavebands (e.g., wavebands C and E) may also indicate an absence or an extinction of the flame in the gas turbine engine 100 (or in the combustor section 116 of the gas turbine engine 100), thus also triggering the flameout relay 212.

With regard to TRIT, further description below includes an exemplary manner of calculation of TRIT (e.g., using the microcontroller 208) and a functioning (e.g., further functioning) of the microcontroller 208 based on the calculated TRIT. Such calculation may be performed by the microcontroller 208 itself. For example, the microcontroller 208 may calculate the turbine rotor inlet temperature (i.e., TRIT) based on the four different current signals deduced by the detector 220 by using the Integrated Spectral Band Ratio (ISBR) method. The below discussion corresponds to an example manner in which TRIT may be calculated by the ISBR method and will be well understood by someone skilled in the art. Nonetheless, other means of calculating TRIT may be contemplated as well, and therefore the ISBR method is discussed below for illustrative purposes only. The ISBR method may include several stages. For the purposes of the present disclosure, each stage described below may be annotated by a character (e.g., an alphanumeric character, such as 'a', 'b', and so on), for ease in understanding and cross-reference.

More particularly, to calculate the TRIT based on the four different current signals by using the ISBR method, the microcontroller 208 may be configured to:

(a) convert the four different current signals into four different voltage signals including a first voltage signal ($Voltage_{B1}$), a second voltage signal ($Voltage_{B2}$), a third voltage signal ($Voltage_C$), and a fourth voltage signal ($Voltage_E$);

(b) obtain a value corresponding to the radiation by: measuring a first radiation value (e.g., see $Intensity_{B1}$) based on the first voltage signal corresponding to a first waveband of the four different wavebands; measuring a second radiation value (e.g., see $Intensity_{B2}$) based on the second voltage signal corresponding to a second waveband of the four different wavebands; measuring a third radiation value (e.g., see $Intensity_C$) based on the third voltage signal corresponding to a third waveband of the four different wavebands; and measuring a fourth radiation value (e.g., see $Intensity_E$) based on the fourth voltage signal corresponding to a fourth waveband of the four different wavebands. In this regard, and, more specifically, see Equation 1 iterated below:

$$Intensity_{B1} = A_{B1} + B_{B1}*Voltage_{B1} + C_{B1}*Voltage_{B1}^2$$

$$Intensity_{B2} = A_{B2} + B_{B2}*Voltage_{B2} + C_{B2}*Voltage_{B2}^2$$

$$Intensity_C = A_C + B_C*Voltage_C + C_C*Voltage_C^2$$

$$Intensity_E = A_E + B_E*Voltage_E + C_E*Voltage_E^2$$

Here, the elements A, B, and C, may be or may correspond to coefficients for each bandwidth B1, B2, C, and E. These coefficients may be determined during a calibration of the system 300, 400 (i.e., the probe 200, the fiber 216, and the detector 220) with a black body radiation source (not shown). Also, the following alphanumeric coding may be understood and applied and/or referred to throughout the example TRIT calculation.

| | |
|---|---|
| B1 | Measured radiation in the B1 waveband |
| B2 | Measured radiation in the B2 waveband |
| C | Measured radiation in the C waveband |
| E | Measured radiation in the E waveband |
| $C_{wall}$ | Radiation (wall component only) in the C waveband |
| $E_{wall}$ | Radiation (wall component only) in the E waveband |
| $C_{gas}$ | Radiation (gas component only) in the C waveband |
| $E_{gas}$ | Radiation (gas component only) in the E waveband |
| B2/B1 ratio | Ratio of B2 over B1 |
| Gas E/C ratio | Ratio of $E_{gas}$ over $C_{gas}$ |

Additionally, one or more online databases of spectral properties and Planck curve data may be leveraged to generate the following data tables:

| Table | Data or Relationship Between Parameters |
|---|---|
| 1 | Wall temperature, Wavelength, and Planck Curve Intensities |
| 2 | Wall temperature and first ratio (or B2/B1 ratio) |
| 3 | Gas E/C ratio, Pressure, H$_2$O concentration, and Gas temperature |
| 4 | Gas temperature, wall temperature, Pressure, H$_2$O concentration, and C$_{wall}$ |
| 5 | Gas temperature, wall temperature, Pressure, H$_2$O concentration, and E$_{wall}$ |

Pursuant to the computation of Equation 1, the microcontroller 208 may be configured to further perform the following operation:

(c) deduce a first ratio of the second radiation value to the first radiation value, i.e., first ratio=Intensity$_{B2}$/Intensity$_{B1}$ or B2/B1;

(d) use the first ratio and a first database (e.g., Table 2) to determine a wall temperature. The wall temperature may correspond to a temperature of walls of the turbine section 120 of the gas turbine engine 100;

(e) use the wall temperature and a second database (e.g., Table 1) to generate a Planck curve (i.e., intensity vs wavelength) (e.g., see graph 500);

(f) use the Planck curve to determine a third wall component and a fourth wall component for the radiation (i.e., C$_{wall}$ and E$_{wall}$) correspondingly at the third waveband (C) and the fourth waveband (E);

(g) subtract the third wall component and the fourth wall component (i.e., C$_{wall}$ and E$_{wall}$) correspondingly from the third radiation value and the fourth radiation value (i.e., C and E from Equation 1 noted above) to correspondingly obtain a third gas component and a fourth gas component (i.e., C$_{gas}$ and E$_{gas}$) of the radiation;

(h) deduce a second ratio of the fourth gas component to the third gas component (i.e., E$_{gas}$ by C$_{gas}$);

(i) use the second ratio and a third database (e.g., Table 3) to obtain a gas temperature;

(j) use values of gas temperatures, wall temperatures, pressures, and water (H$_2$O) concentrations, from a fourth database (e.g., Table 4) and a fifth database (e.g., Table 5), to arrive at a fifth wall component and sixth wall component (i.e., new C$_{wall}$ and new E$_{wall}$) correspondingly at the third waveband (C) and the fourth waveband (E);

(k) subtract the fifth wall component and the sixth wall component (i.e., new C$_{wall}$ and new E$_{wall}$) correspondingly from the third radiation value and the fourth radiation value (i.e., C and E from Equation 1) to correspondingly obtain a different/new third gas component and a different/new fourth gas component (i.e., new C$_{gas}$ and new E$_{gas}$) of the radiation; and (l) repeat the steps of (h), (i), (j), and (k), for different third gas components and different fourth gas components for a predetermined number of instances to arrive at the TRIT or a final gas temperature.

Once the TRIT is calculated, the microcontroller 208 may determine the flameout condition based on the TRIT and correspondingly generate a flameout signal in the gas turbine engine 100. As an example, the microcontroller 208 may determine the flameout condition when at least one of: the TRIT is below the temperature threshold, T, or when a rate of drop of the TRIT is below the rate threshold, RT. Considering that the microcontroller 208 determines the flameout condition, the microcontroller 208 generates the flameout signal.

In response to the flameout signal, the microcontroller 208 may trigger the flameout relay 212 to move and/or cause one or more fueling valves (e.g., the fueling valve 152) of the gas turbine engine 100 to halt fuel supply into the combustor section 116 of the gas turbine engine 100. It may be noted that halting of the fuel supply may, in some embodiments, correspond to a deactivation of the gas turbine engine 100.

In this regard, if system 300 is applied in the gas turbine engine 100, i.e., if the flameout relay 212 is coupled and integrated with the series of additional relays 176 to define the shutdown relay system 180 of the gas turbine engine 100, then, to cause the fueling valve 152 to halt a fuel supply into the combustor section 116 of the gas turbine engine 100 in response to the flameout signal, the microcontroller 208 may deliver the flameout signal to the main controller 168. In response to said delivery, the main controller 168 may trigger all relays 176 across the shutdown relay system 180 and move the fueling valve 152 to the shutdown state, and, in some cases, also deactivating the gas turbine engine 100. Effectively, causing the fueling valve 152 to halt fuel supply into the combustor section 116 in response to the flameout signal, in case of the system 300, may correspond to the microcontroller 208 delivering the flameout signal to the main controller 168 to trigger all relays 176 across the shutdown relay system 180 to move the fueling valve 152 to the shutdown state.

Alternatively, if system 400 is applied in the gas turbine engine 100, i.e., if the flameout relay 212 is independent of the shutdown relay system 180 and is directly coupled to the fueling valve 152, to cause the fueling valve 152 to halt the fuel supply into the combustor section 116 of the gas turbine engine 100 in response to the flameout signal, the microcontroller 208 may deliver (e.g., directly deliver) the flameout signal to the flameout relay 212 (e.g., to the flameout relay 212 alone). In so doing, the flameout relay 212 may be triggered to move the fueling valve 152 to the shutdown state. Effectively, causing the fueling valve 152 to halt fuel supply into the combustor section 116 in response to the flameout signal, in case of the system 400, may correspond to the microcontroller 208 delivering the flameout signal to the flameout relay 212 to trigger the flameout relay 212 and move the fueling valve 152 to the shutdown state, e.g., without triggering all relays 176 across the shutdown relay system 180.

In some embodiments, and with regard to system 400, it is further possible that a shutdown signal is generated corresponding to the shutdown state of the fueling valve 152 and the microcontroller 208 may supply this shutdown signal to the main controller 168 of the gas turbine engine 100, as well. In response to the receipt of the shutdown signal by the main controller 168, as noted above, the main controller 168 may trigger all relays 176 across the shutdown relay system 180 to ensure a deactivation or shut down of all parts/portions the gas turbine engine 100 and/or may determine a working state of the gas turbine engine 100.

The system 300, 400 (and the associated method as described above) allows the flameout condition to be detected significantly faster than any other conventional manner of flameout detection. The quicker the flameout detection, the lower are the chances for the fuel to seep or escape downstream, e.g., into various portions of the gas turbine engine 100. In other words, the probe 200 (e.g., the pyrometer probe 200') and the microcontroller 208 (e.g., the PCB hardware device) in conjunction with the fiber 216 (e.g., the sapphire fiber 216') can detect flameout relatively very quickly as compared to conventional methods and this prevents an ignitable mixture of air and fuel (which may include fuels such as hydrogen gas) from entering and accumulating in the turbine section 120 or even in the exhaust manifold 108 in the event of the flameout condition.

The systems 300, 400 ensures a durable and prolonged work life of the gas turbine engine 100, even when fuels, such as Hydrogen or other alternative fuels, are applied to run the gas turbine engine 100. Moreover, the effort and cost to procure, install, and maintain, the system 300, 400, including the probe 200, the spectral data receiver unit 204, and the microcontroller 208 (e.g., the PCB hardware device), are significantly low, as well.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as examples only, with a true scope of the disclosure being indicated by the following claims and their equivalent.

What is claimed is:

1. A system for detecting and responding to a flameout condition in a gas turbine engine, the system comprising:
   a probe positioned within the gas turbine engine, the probe configured to detect a radiation from a gaseous content resulting from a combustion reaction within the gas turbine engine;
   a spectral data receiver unit configured to process a signal associated with the radiation for four different wavebands and correspondingly deduce four different current signals; and
   a flameout relay configured to be triggered to move one or more fueling valves of the gas turbine engine to a shutdown state to halt fuel supply into the gas turbine engine based on at least one of:
      one or more of the four different current signals meet a predefined condition, or
      a turbine rotor inlet temperature (TRIT) derived or calculated from the four different current signals is below a temperature threshold or a rate of drop of the TRIT is below a rate threshold.

2. The system of claim 1, further including a microcontroller, configured to:
   calculate the turbine rotor inlet temperature (TRIT) based on the four different current signals by using an Integrated Spectral Band Ratio (ISBR) method;
   determine the flameout condition and correspondingly generate a flameout signal in the gas turbine engine when at least one of: the TRIT is below the temperature threshold or when the rate of drop of the TRIT is below the rate threshold; and
   trigger the flameout relay to move the one or more fueling valves of the gas turbine engine to halt fuel supply into the gas turbine engine in response to the flameout signal.

3. The system of claim 2, wherein the flameout relay is operably coupled to and is associated with the one or more fueling valves, wherein:
   the flameout relay is configured to be coupled and integrated with a series of additional relays to define a shutdown relay system of the gas turbine engine, the shutdown relay system being applicable to deactivate the gas turbine engine when any relay of the shutdown relay system is supplied with a shutdown signal, and
   to move the one or more fueling valves to halt fuel supply into the gas turbine engine in response to the flameout signal, the microcontroller is configured to deliver the flameout signal to a main controller of the gas turbine engine to trigger all relays across the shutdown relay system and move the one or more fueling valves to the shutdown state.

4. The system of claim 2, wherein the flameout relay is configured to be operably coupled to and is associated with the one or more fueling valves, wherein:
   to move the one or more fueling valves to halt fuel supply into the gas turbine engine in response to the flameout signal, the microcontroller is configured to deliver the flameout signal to the flameout relay to trigger the flameout relay and move the one or more fueling valves to the shutdown state.

5. The system of claim 4, wherein a shutdown signal is generated corresponding to the shutdown state of the one or more fueling valves, wherein the microcontroller is configured to supply the shutdown signal to a main controller of the gas turbine engine.

6. The system of claim 2, wherein to calculate the TRIT based on the four different current signals by using the ISBR method, the microcontroller is configured to:
   (a) convert the four different current signals into four different voltage signals including a first voltage signal, a second voltage signal, a third voltage signal, and a fourth voltage signal;
   (b) obtain a value corresponding to the radiation by:
      measuring a first radiation value (B1) based on the first voltage signal corresponding to a first waveband of the four different wavebands; measuring a second radiation value (B2) based on the second voltage signal corresponding to a second waveband of the four different wavebands; measuring a third radiation value (C) based on the third voltage signal corresponding to a third waveband of the four different wavebands; measuring a fourth radiation value (E) based on the fourth voltage signal corresponding to a fourth waveband of the four different wavebands;
   (c) deduce a first ratio of the second radiation value to the first radiation value;

(d) use the first ratio and a first database to determine a wall temperature, wherein the wall temperature corresponds to a temperature of walls of a turbine section of the gas turbine engine;

(e) use the wall temperature and a second database to generate a Planck curve;

(f) use the Planck curve to determine a third wall component and a fourth wall component for the radiation correspondingly at the third waveband (C) and the fourth waveband (E);

(g) subtract the third wall component and the fourth wall component correspondingly from the third radiation value and the fourth radiation value to correspondingly obtain a third gas component and a fourth gas component of the radiation;

(h) deduce a second ratio of the fourth gas component to the third gas component;

(i) use the second ratio and a third database to obtain a gas temperature;

(j) use values of gas temperatures, wall temperatures, pressures, and water concentrations, from a fourth database and a fifth database, to arrive at a fifth wall component and sixth wall component correspondingly at the third waveband (C) and the fourth waveband (E);

(k) subtract the fifth wall component and the sixth wall component correspondingly from the third radiation value and the fourth radiation value to correspondingly obtain a different third gas component and a different fourth gas component of the radiation; and (l) repeat steps of (h), (i), (j), and (k), for different third gas components and different fourth gas components for a predetermined number of instances to arrive at the TRIT or a final gas temperature.

7. The system of claim 1, wherein the combustion reaction occurs at a combustor section of the gas turbine engine and the probe is configured to be positioned downstream to the combustor section along a direction of flow of the gaseous content resulting from the combustion reaction.

8. The system of claim 1, wherein the spectral data receiver unit includes:
a fiber to provide passage to the signal therethrough from the probe; and
a detector to convert the signal into the four different current signals.

9. The system of claim 8, wherein
the flameout relay is an optical relay;
the gaseous content includes water vapor, and
the fiber is a sapphire fiber configured to be routed through an outer wall of the gas turbine engine and extend at least partly out of the gas turbine engine to connect the probe to the detector.

10. A method for detecting and responding to a flameout condition in a gas turbine engine, the method comprising:
positioning a probe within the gas turbine engine to detect a radiation from a gaseous content resulting from a combustion reaction within the gas turbine engine;
using a spectral data receiver unit to process a signal associated with the radiation for four different wavebands to correspondingly deduce four different current signals; and
applying a flameout relay, the flameout relay configured to be triggered to move one or more fueling valves of the gas turbine engine to a shutdown state to halt fuel supply into the gas turbine engine based on at least one of:
one or more of the four different current signals meet a predefined condition, or
a turbine rotor inlet temperature (TRIT) derived or calculated from the four different current signals is below a temperature threshold or a rate of drop of the TRIT is below a rate threshold.

11. The method of claim 10, using a microcontroller to:
calculate the turbine rotor inlet temperature (TRIT) based on the four different current signals by using an Integrated Spectral Band Ratio (ISBR) method;
determine the flameout condition and correspondingly generate a flameout signal in the gas turbine engine when at least one of: the TRIT is below the temperature threshold or when the rate of drop of the TRIT is below the rate threshold; and
trigger the flameout relay to move the one or more fueling valves of the gas turbine engine to halt fuel supply into the gas turbine engine in response to the flameout signal.

12. The method of claim 11, wherein applying the flameout relay includes:
operably coupling the flameout relay to the one or more fueling valves to be associated with the one or more fueling valves; and
integrating the flameout relay with a series of additional relays to define a shutdown relay system of the gas turbine engine, the shutdown relay system being applicable to deactivate the gas turbine engine when any relay of the shutdown relay system is supplied with a shutdown signal, wherein moving the one or more fueling valves to halt fuel supply into the gas turbine engine in response to the flameout signal includes:
delivering by the microcontroller the flameout signal to a main controller of the gas turbine engine to trigger all relays across the shutdown relay system and move the one or more fueling valves to the shutdown state.

13. The method of claim 11, wherein applying the flameout relay includes:
operably coupling the flameout relay to the one or more fueling valves to be associated with the one or more fueling valves, wherein moving the one or more fueling valves to halt fuel supply into the gas turbine engine in response to the flameout signal includes:
delivering, by the microcontroller, the flameout signal to the flameout relay to trigger the flameout relay and move the one or more fueling valves to the shutdown state.

14. The method of claim 13, wherein a shutdown signal is generated corresponding to the shutdown state of the one or more fueling valves, the method further including:
supplying, by the microcontroller, the shutdown signal to a main controller of the gas turbine engine.

15. The method of claim 11, wherein to calculate the TRIT based on the four different current signals by using the ISBR method, the microcontroller is configured to:

(a) convert the four different current signals into four different voltage signals including a first voltage signal, a second voltage signal, a third voltage signal, and a fourth voltage signal;

(b) obtain a value corresponding to the radiation by:
measuring a first radiation value based on the first voltage signal corresponding to a first waveband of the four different wavebands; measuring a second radiation value based on the second voltage signal corresponding to a second waveband of the four different wavebands; measuring a third radiation value based on the third voltage signal corresponding to a third waveband of the four different wavebands;

measuring a fourth radiation value based on the fourth voltage signal corresponding to a fourth waveband of the four different wavebands;

(c) deduce a first ratio of the second radiation value to the first radiation value;

(d) use the first ratio and a first database to determine a wall temperature, wherein the wall temperature corresponds to a temperature of walls of a turbine section of the gas turbine engine;

(e) use the wall temperature and a second database to generate a Planck curve;

(f) use the Planck curve to determine a third wall component and a fourth wall component for the radiation correspondingly at the third waveband and the fourth waveband;

(g) subtract the third wall component and the fourth wall component correspondingly from the third radiation value and the fourth radiation value to correspondingly obtain a third gas component and a fourth gas component of the radiation;

(h) deduce a second ratio of the fourth gas component to the third gas component;

(i) use the second ratio and a third database to obtain a gas temperature;

(j) use values of gas temperatures, wall temperatures, pressures, and water concentrations, from a fourth database and a fifth database, to arrive at a fifth wall component and sixth wall component correspondingly at the third waveband and the fourth waveband;

(k) subtract the fifth wall component and the sixth wall component correspondingly from the third radiation value and the fourth radiation value to correspondingly obtain a different third gas component and a different fourth gas component of the radiation; and (l) repeat steps of (h), (i), (j), and (k), for different third gas components and different fourth gas components for a predetermined number of instances to arrive at the TRIT or a final gas temperature.

16. The method of claim 10, wherein using the spectral data receiver unit to process the signal includes:

using a fiber to provide passage to the signal therethrough from the probe and a detector to convert the signal into the four different current signals, and wherein:
the flameout relay is an optical relay,
the gaseous content includes water vapor,
the fiber is a sapphire fiber configured to be routed through an outer wall of the gas turbine engine and extend at least partly out of the gas turbine engine to connect the probe to the detector,
the combustion reaction occurs at a combustor section of the gas turbine engine, and
the probe is configured to be positioned downstream to the combustor section along a direction of flow of the gaseous content resulting from the combustion reaction.

17. A gas turbine engine, comprising:
a compressor section to compress air;
a combustor section to receive fuel and a volume of compressed air from the compressor section to define a compressed fuel-air mixture ignitable to attain a combustion reaction;
a turbine section for expanding by-products of the combustion reaction, the by-products include gaseous content resulting from the combustion reaction of the compressed fuel-air mixture at the combustor section;
a system for detecting and responding to a flameout condition in the gas turbine engine, the system comprising:
a probe positioned within the gas turbine engine, the probe configured to detect a radiation from the gaseous content resulting from the combustion reaction;
a spectral data receiver unit configured to process a signal associated with the radiation for four different wavebands and correspondingly deduce four different current signals; and
a flameout relay configured to be triggered to move one or more fueling valves of the gas turbine engine to a shutdown state to halt fuel supply into the gas turbine engine based on at least one of:
one or more of the four different current signals meet a predefined condition, or
a turbine rotor inlet temperature (TRIT) derived or calculated from the four different current signals is below a temperature threshold or a rate of drop of the TRIT is below a rate threshold.

18. The gas turbine engine of claim 17, further including a microcontroller, configured to:
calculate the turbine rotor inlet temperature (TRIT) based on the four different current signals by using an Integrated Spectral Band Ratio (ISBR) method;
determine the flameout condition and correspondingly generate a flameout signal in the gas turbine engine when at least one of: the TRIT is below the temperature threshold or when the rate of drop of the TRIT is below the rate threshold; and
trigger the flameout relay to move the one or more fueling valves of the gas turbine engine to halt fuel supply into the combustor section of the gas turbine engine in response to the flameout signal.

19. The gas turbine engine of claim 18, wherein the flameout relay is operably coupled to and is associated with the one or more fueling valves, wherein:
the flameout relay is coupled and integrated with a series of additional relays to define a shutdown relay system of the gas turbine engine, the shutdown relay system being applicable to deactivate the gas turbine engine when any relay of the shutdown relay system is supplied with a shutdown signal, and
to move the one or more fueling valves to halt fuel supply into the combustor section of the gas turbine engine in response to the flameout signal, the microcontroller is configured to deliver the flameout signal to a main controller of the gas turbine engine to trigger all relays across the shutdown relay system and move the one or more fueling valves to the shutdown state.

20. The gas turbine engine of claim 18, wherein the flameout relay is operably coupled to and is associated with the one or more fueling valves, wherein:
to move the one or more fueling valves to halt fuel supply into the combustor section of the gas turbine engine in response to the flameout signal, the microcontroller is configured to deliver the flameout signal to the flameout relay to trigger the flameout relay and move the one or more fueling valves to the shutdown state.

* * * * *